United States Patent [19]

Crothers et al.

[11] Patent Number: 4,796,990
[45] Date of Patent: Jan. 10, 1989

[54] METHOD AND APPARATUS FOR SUPERIMPOSING SCENES

[76] Inventors: Paul Crothers, 2388 Ontono Cir., Thousand Oaks, Calif. 91362; Robert Schaffer, 160 Triangle St., Thousand Oaks, Calif. 91360

[21] Appl. No.: 510,299

[22] Filed: Jul. 1, 1983

[51] Int. Cl.$^4$ .......................... G03B 19/18; A63J 5/00
[52] U.S. Cl. ........................................ 352/89; 352/45; 352/46; 352/47
[58] Field of Search ........................ 352/44, 45, 46, 47, 352/85, 89

[56] References Cited

U.S. PATENT DOCUMENTS

| | | | |
|---|---|---|---|
| 2,028,975 | 1/1936 | Gillette | 352/46 |
| 2,615,364 | 10/1952 | Tondreau | 354/219 |
| 2,669,902 | 2/1954 | Barnes | 350/394 |
| 2,727,427 | 12/1955 | Jenkins | 352/47 |
| 2,727,429 | 12/1955 | Jenkins | 352/89 |
| 3,260,563 | 7/1966 | Hoard | |
| 4,018,519 | 4/1977 | Clapp | 352/89 |
| 4,457,599 | 7/1984 | Sawicki | 352/89 |

FOREIGN PATENT DOCUMENTS 4735457 12/1967 Japan ................................ 352/47

OTHER PUBLICATIONS

Perkin-Elmer Bulletin No. PBC 8-1-71.

Primary Examiner—Monroe H. Hayes
Attorney, Agent, or Firm—Poms, Smith, Lande & Rose

[57] ABSTRACT

The device includes a camera having first and second imaging mediums. Polarized illumination is directed toward the camera from a screen mounted behind the foreground object. The foreground object blocks some polarized light from reaching the camera. Unpolarized light illuminates the foreground object, and the light reflects from the foreground object to the camera. A prism in the camera reflects polarized light to the first imaging medium and transmits the orthogonal components from the foreground object to the second imaging medium. The image received by the first imaging medium is combined with a background scene, and the image received by the second imaging medium is added to the combined image of the first imaging medium and the background scene.

12 Claims, 3 Drawing Sheets

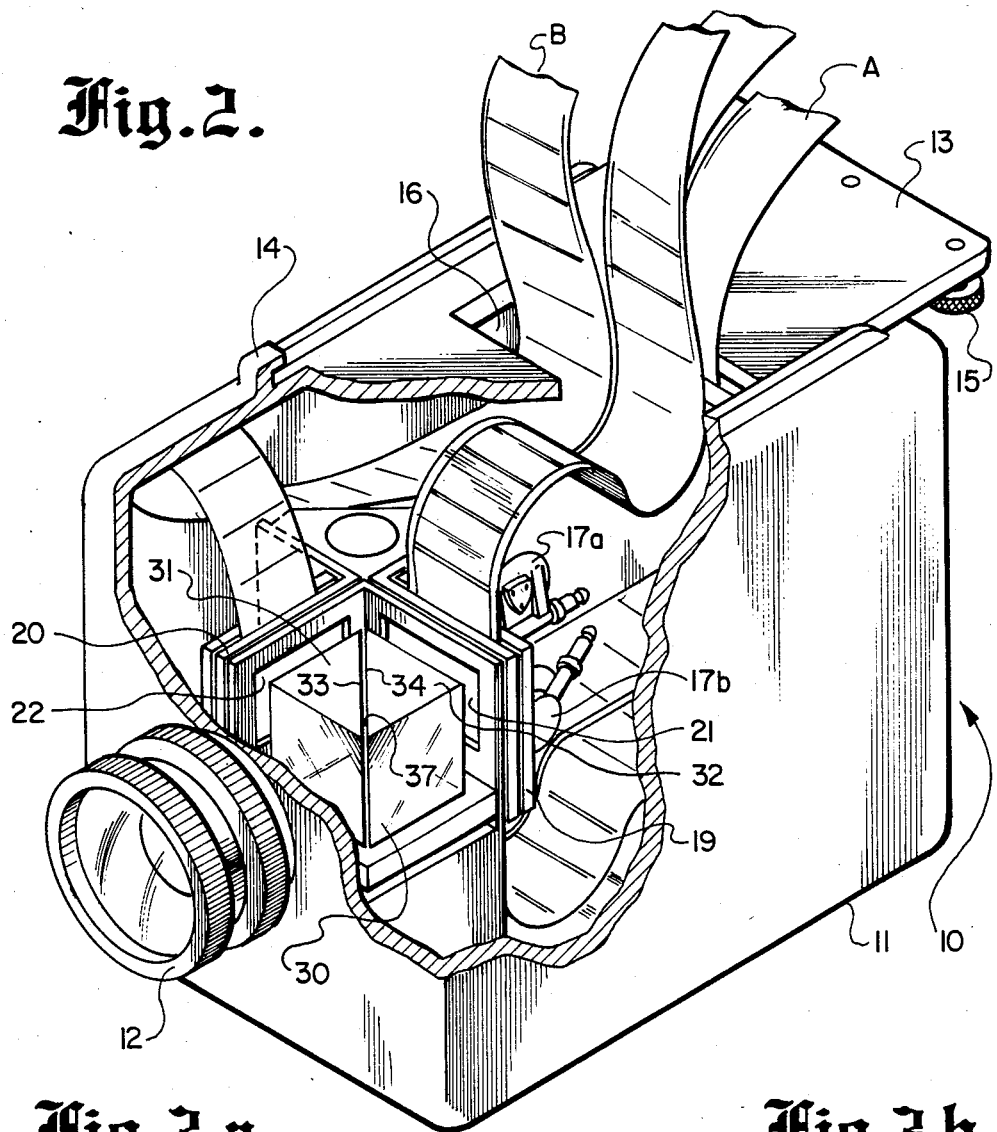
Fig. 2.
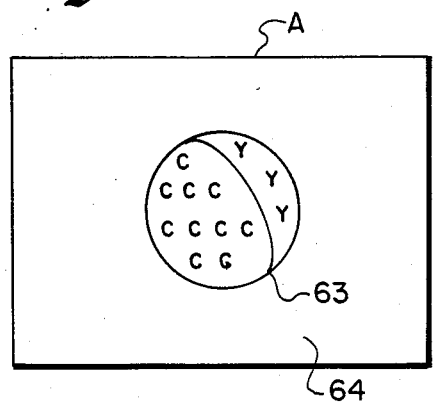
Fig. 3.a.
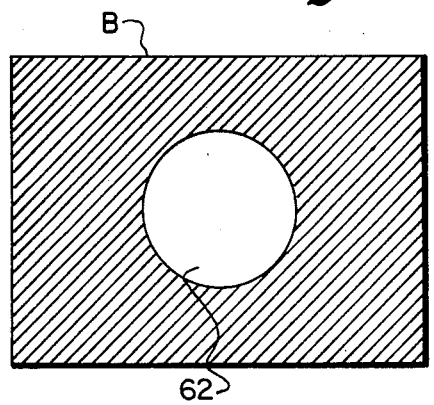
Fig. 3.b.

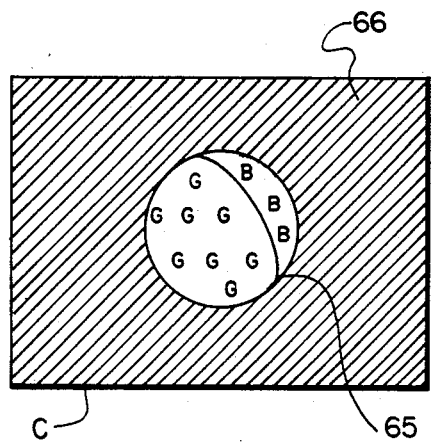
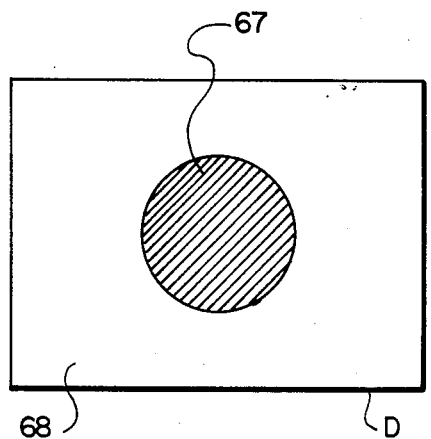
Fig.4.a.    Fig.4.b.
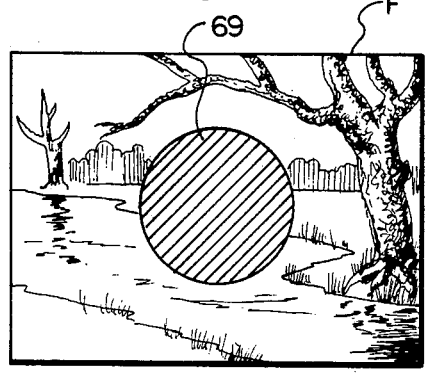
Fig.5.a.    Fig.5.b.
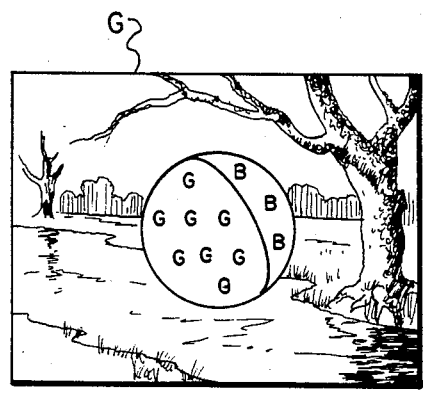
Fig.6.

METHOD AND APPARATUS FOR SUPERIMPOSING SCENES

BACKGROUND OF THE INVENTION

1. Field of the Invention

This invention relates to a method and apparatus of superimposing objects onto a scene of a motion picture.

2. Description of the Prior Art

In motion pictures and in television, it is frequently impractical or impossible to film objects or actors in certain locations or background scenes. For example, if a particular scene in a motion picture required an actor to pass in front of a building that no longer exists or is inaccessible, film makers will superimpose the actor in a scene of the building taken at a separate time or in a scene of a model of the building.

One of the oldest ways to superimpose the actor or object into a scene was by projecting the scene onto a screen behind the actor and photographing the actor in front of the projected image. One projection technique utilized a front projector, which directs light through a half-silvered mirror along the optical axis of the camera to a retro-reflective screen and back to the camera. Because a retro-reflective screen reflects much more of the projected light to the camera than the foreground object reflects, almost none of the background scene appears on the filmed image. These methods are most inconvenient and requires all stock footage to be filmed first. Much is wasted and if the background is to be changed later, the actors must re-shoot the scene with the new background. More recently, other processes have been used.

One process is called the blue-screen process. Essentially the desired foreground object such as an actor is positioned in front of a monochromatic screen. The screen is usually blue, translucent plastic that is illuminated by rear projection, or it is a blue wall illuminated in front. The scene is then filmed, the resultant print is then processed, and the blue background is filtered out. The method uses much film, is time consuming and is labor intensive, having many steps in order to yield a composite scene.

The "sodium-yellow" method, named for the sodium vapor lamp that radiates light in a narrow range of wavelengths, uses yellow light in this narrow band. The actor is illuminated by two sources of light. The first source is general illumination at desired angles to illuminate the foreground object properly. The sources are filtered to eliminate any light in the narrow, yellow wavelength. This lighting is accomplished using well-known lighting techniques, which normally employs two or more separate light sources for shadow and highlight control. The second source of light radiates sodium yellow light rear projected through a screen behind the foreground objects.

The general light reflects from the foreground object to a camera lens which directs the light to a beam splitter. The lens also directs the yellow light from the screen is also directed to the beam splitter. The foreground object blocks the rear screen. The beam splitter is a specially designed precision prism that is designed to reflect all light in the narrow band to one film plane and pass all other light to the other film plane.

Along the first path, the light is focused and exposes a first film negative. Lighting levels and camera exposure are set so that the yellow light exposes that portion of the film negative that receives light from the rear projection screen. Because of the filters on the first, general source, the foreground object receives and reflects no light from the first source in the narrow band. The light from the first, general source that illuminates the foreground object passes through the beam splitter and exposes the image of the foreground object on a second negative normally except that the light in the narrow wavelengths is filtered out.

Therefore, two negatives are formed. The first has a barely exposed, almost clear area for the foreground object and an exposed, black area for the screen. In the second negative, the screen is essentially clear, but the foreground object is normally exposed. When positives are made from each negative, the first exposure has a black silhouette with a transparent outline where the foreground screen was.

It is very difficult, however, to construct a beam splitting prism properly. Extremely minor imperfections in the dielectric coatings of the prism result in significant degrading of the mattes so that the system does not work. As a result, there are only a small number of sodium-yellow systems in existence.

It is also been proposed to use light outside of the visible spectrum, i.e. infrared or ultraviolet light. Both have focusing problems because of their shorter or longer wavelengths with respect to the average focusing of light of the visible spectrum. Ultraviolet light creates some danger to actors, so shooting periods must be short. Typical foreground objects such as people also radiate some infrared light. Therefore, using infrared or ultraviolet light has proved unsatisfactory.

SUMMARY OF THE INVENTION

The principal object of the present invention is to disclose and provide a method and apparatus for producing a photograhic matte without the drawbacks in the prior art processes and apparatuses. Overcoming the expense and imperfections inherent in the blue screen process is of major importance. By eliminating the errors, the foreground object will appear life-like when superimposed into the scene.

The present invention contemplates using polarized light as one source of illumination. Specifically, the foreground object and the screen behind the object are illuminated by general illumination. The rear screen is illuminated also by polarized light, which is either rear projected through the screen or front projected at the screen and reflected from it. If using front projection, the polarized light is directed on the optical axis through a half-silvered mirror to a retro-reflective screen. The light reflects back along the photographic axis. The general light and the polarized light are directed to a beam splitter, which reflects light polarized in a first plane of polarization to one film plane. Light that is polarized orthogonally to the first plane passes through the beam splitter to a second film plane. The exposures are set such that the polarized light exposes in uniform density the first negative for all areas except those blocked by the foreground object in front of the screen. With the proper exposure control, the amount of light polarized in the first plane reflecting from the foreground object is slight so that the light minimally exposes the image of the foreground objects on the film. The foreground object is normally illuminated by general illumination and its image is exposed on the second negative.

In constructing the beam splitter of the apparatus of the present invention, unequal stresses in the glass might cause portions of the material to be optically anisotropic, which causes variations in wave propagation and ultimately rotates the plane of polarization. One of the objects of the present invention is to utilize polarized light but eliminate these distortions. This can be solved by proper filter placement.

Another problem occurs when the foreground object has a tinted, transparent region. Examples of this include automobiles with tinted glass or a person wearing lightly tinted sunglasses. When one views a background scene normally through a tinted object, the background seen through the tinted object becomes partially tinted. Unless the matte processing can make the superimposed background appear tinted through a colored, transparent object, the scene is not realistic. Therefore, in the past tinted, transparent objects have been avoided. An object of the present invention is to permit the use of these objects easily and cause them to be reproduced realistically in the final superimposed scene.

The beam splitter used in the present invention is a pair of right-angle prisms each having 45° angle faces that are mounted together. Layers of a polarizing dielectric are deposited on the angled face of the front prism. The face of the second prism is in contact with the reflecting face of the first prism. The polarizing dielectric reflects all light polarized in a given plane toward one negative but allows light in the perpendicular plane to pass directly to the other negative.

These and other objects of the present invention will become evident in the foregoing description of the preferred embodiment.

BRIEF DESCRIPTION OF THE DRAWINGS

FIG. 2 is a perspective view, partially cut away of the motion picture camera that is used in the present invention.

FIGS. 3-5 are representations of the negatives and positives that the present invention creates. FIG. 3A is the negative from which polarized light is blocked, and FIG. 3B, which is referred to as a cover matte, is the negative that is exposed to polarized light.

FIG. 4A is the positive image obtained through developing the negative in FIG. 3A. FIG. 4B, which is referred to as the holdout matte, is the positive image obtained from developing the negative in FIG. 3B.

FIG. 5A is the stock scene in which one is inserting an object or an actor. FIG. 5B is a composite of the positive image of FIG. 4B with the background scene positive in FIG. 5A.

FIG. 6 is a combination of the positive in FIG. 5A with FIG. 5B.

DETAILED DESCRIPTION OF THE PREFERRED EMBODIMENT

Figure 1:
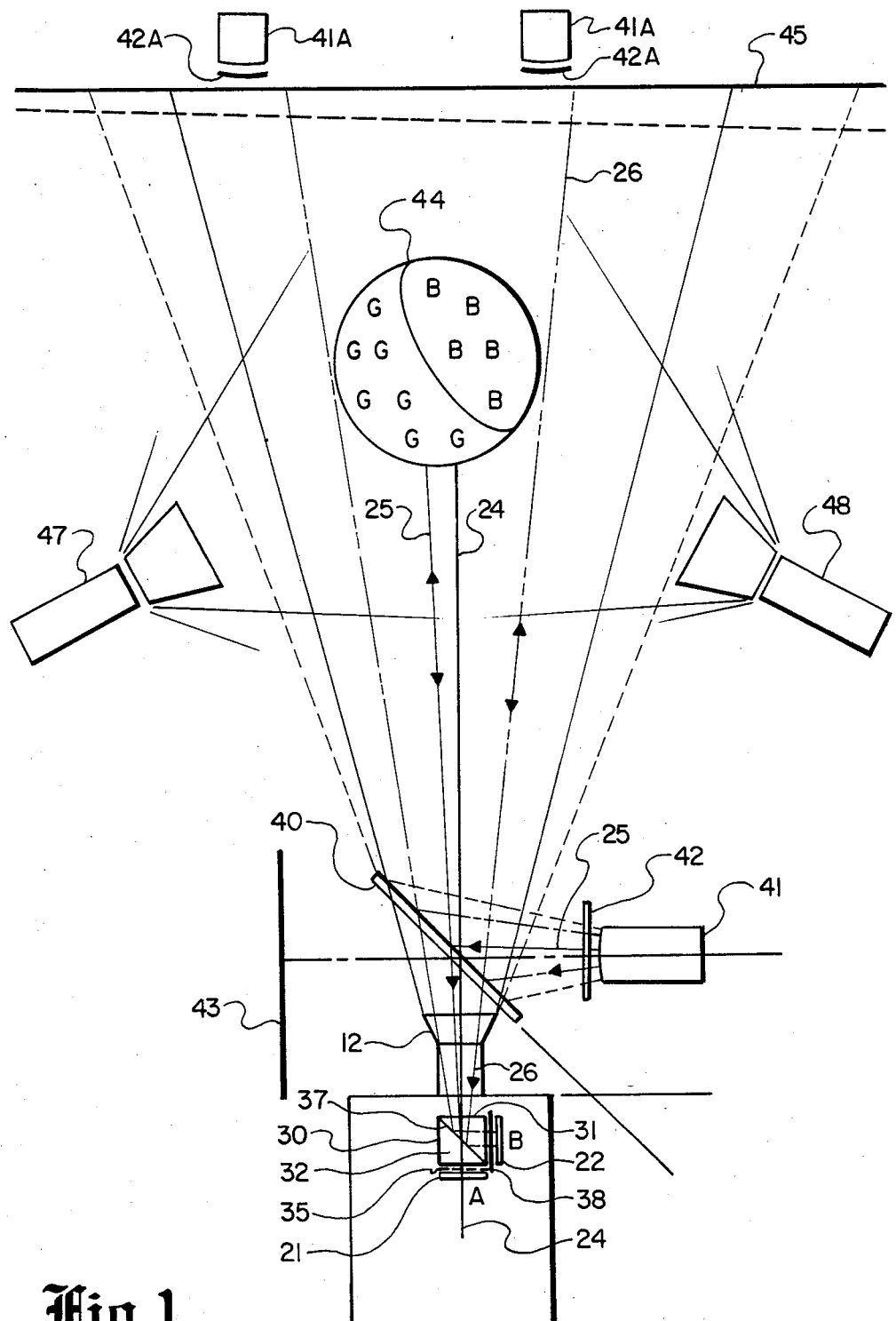
FIG. 1 is a schematic view looking downward on the apparatus of the present invention.

Camera 10 (FIGS. 1 and 2) is a beam splitter camera. As shown in FIG. 6, the camera comprises a body 11 and a lens 12 having optical characteristics chosen for the particular special effect. Lens 12 typically has an adjustable aperture for controlling the amount of light reaching the film plane.

Two rolls of film are stored side-by-side in a magazine (not shown) that attaches to camera 10 on magazine holder surface 13 (FIG. 2). Bracket 14 holds a forward lip of the magazine at the front end of surface 13, and screws 15 hold the rear end of the film magazine. The bottom opening of the film magazine aligns with opening 16 into the camera. Film A from the first reel is threaded from the magazine through opening 16, and drive 17a pulls the film through holder 19 past film plane 21 (See also FIG. 1). Sprocket 17b and additional sprocket drives (not visible) return the exposed film up through opening 16 and onto a takeup reel in the film magazine. Similarly, the camera withdraws film B from a second supply reel in the magazine, and it is directed by a drive (not shown) through holder 20 past film plane 22. Addition drive elements return the exposed film through opening 16 onto a second takeup spool in the magazine. The film drives that drive motion picture film A and B are coordinated so that frames of each film are exposed and moved together. A single shutter (not shown) or separate, coordinated shutters associated with each film holder 19 and 20 are provided utilizing known shutter construction and placement. Although the examplary embodiment relates to motion pictures, the system can be adapted to video effects.

The terms "optical axis" or "photographic axis" refer to the optical axis of lens 12 as it extends forward from camera 10 and reaward to the centers of film planes 21 and 22. Rear screen 45 behind foreground object 44 may be a rear projection screen illuminated by rear sources 41A (FIG. 1). Filters 42A absorbs so-called P component light but permit S component to pass.

If instead of a rear projection screen, a front projection one is used, a half-silvered mirror 40 (FIG. 1) would be mounted in optical axis 24. Half-silvered mirrors have thin silver or reflective coatings that transmit a portion of the light and reflect another portion. The thickness of the coating determines the ratio of light reflected versus light transmitted. In FIG. 1 light from a first source 41 passes through a polarized filter 42 (having the same properties as filter 42A) and is reflected off half-silvered mirror 40 toward an object 44 and screen 45. As shown in FIG. 1, source 41 is mounted at a right angle to the optical axis 24 and positioned so that light reflects off half-silvered mirror 40, which is at 45° angle to the optical axis, and reflects to the optical axis. Light from polarized source 41 that is not reflected by half-silvered mirror 40 is absorbed on absorbent screen 43, which has a matte black finish.

Foreground object 44 may be an actor, but for convenience, it is shown as a spherical ball. The major portion of the ball is green in the example as indicated by "G's." A blue, smaller portion is covered with the letter "B."

Object 44 is also illuminated by a second source of light, which in FIG. 1 is represented by two studio lights 47 and 48. The number, position, intensity and color of the second source of light varies with the illumination requirments of object 44.

The normal transverse electromagnetic radiation is in random directions. The vector components of the vibrations for light that is not polarized can be said to be equally divided between two perpendicular axes, the S axis and the P axis. As light propagates, the axes are viewed as planes. Plane polarized light contains light vibrating in one plane. When light is to be polarized in the S-plane, for example, a filter blocks the P-plane components of the radiation. Although the exemplary embodiment discussed S-plane and P-plane polarized light, the polarization can be in any desired orientation, such as a circular polarized light.

In the front illumination system, polarized light from first source 41 illuminates both the front of object 44 and screen 45 and reflects back toward camera 10. Preferably, screen is a retro-reflective screen, which reflects light back to the source of light practically independent of the angle of the source to the material. The material stays relatively dark if one is looking at the material being illuminated by a source away from the viewer. One such retro-reflective material is called Scotchlite, a trademark of the 3M Corporation. In the rear illumination example, screen 45 is illuminated from behind by sources 41A. Returning to the front projection example, hypothetical light ray 25, which eminates from polarized source 41, is reflected off half-silvered mirror 40 and strikes object 44 where it is reflected back through half-silvered mirror 40 and into lens 12 to prism 30. Although for convenience, ray 25 has been shown as reflecting back on itself, much of the light reflected off objects is diffused or absorbed. The prism, which will be described in much greater detail below, reflects S-plane component polarized light to film B at plane 22 and passes P-plane component polarized light to film plane A at plane 21.

Unlike the rays that strike foreground object 44 that are partially diffused or absorbed, rays of light (for example ray 26) that do not strike object 44 reach retro-reflective screen 45 where most of the light is reflected back along ray 26. A portion of returning ray 26 is reflected by half-silvered mirror 40, but the portion that passes through the mirror is directed by lens 12 to prism 30. The polarized light that prism 30 reflects toward film B at film plane 22 exposes that film. When developed, the film yields negative B shown in FIG. 3B. This is referred to as the traveling matte. The levels of illumination are chosen such that rays like ray 26 that reach retro-reflective screen 45 and reflect back into camera 10 expose area 61 (FIG. 3B) to maximum density. On the other hand, because foregoing object 44 diffuses and absorbs light, a much smaller amount of light from object 44 is reflected to film B at film plane 22. By properly choosing the illumination level, film sensitivity and exposure properly, there will be very little of the film area at 62 (FIG. 2B).

The light from second sources 47 and 48, which is not polarized, reflects from foreground object 44 through lens 12 to prism 30. The specially constructed prism, which is discussed below, reflects to film plane 22 S-plane polarized light from screen 45 and the S-plane component from the unpolarized source. Therefore, the P-plane radiation passes through prism 30 to film A at film plane 21 to expose the color negative film there. The S-plane polarized light could be blocked from reaching film A at film plane 21 by a polarizing filter 35. The special prism, however, yields superior results, as discussed below.

In FIG. 3A, area 63 is the negative image of object 44 on film A. Assuming the front illumination system is used, because light sources 47 and 48 are well off photographic or optical axis 24, little of the light from them that strikes retro-reflective screen 45 is reflected back to camera 10. A polarizing filter 49 could block that reflected light. Therefore, there is not exposure of area 64 of color film A (FIG. 3A). Even in the system that illuminates the screen from the rear, the intensity of the unpolarized light reflecting from screen 45 can be minimized. Thus, area 64 of film A is essentially clear, and area 63 is a proper negative image of object 44 divided into their negative complementary colors from the blue and green colors of the object, namely yellow and cyan (indicated by the Y's and C's in image 63).

Although prism 30 also directs a portion of the S-plane component from second sources 47 and 48 and object 44 to film B, the intensity is small, and the exposure can be controlled so there will be minimized exposure of area 62 on film B (FIG. 3B).

The negative of film A is then optically printed as a positive onto film stock C (FIG. 4A) to form what is known as a holdout matte. What had been negative image 63 of object 44 is now a positive image 65 showing the green and blue regions identical to that of object 44 in FIG. 1. Likewise, clear area 64 of negative A (FIG. 3A) prints as black region 66 on positive C in FIG. 4A. Conversely, negative B, which normally is black and white film, is printed on black and white film stock D as shown in FIG. 4B. Clear region 62 prints black at 67, and black region 61 of negative B (FIG. 3B) prints clear at 68 on film D in FIG. 4B.

Frame E (FIG. 5A) is a background scene into which object 44 is being inserted. Frame E is combined with frame D (FIG. 4B) to yield frame F (FIG. 5B). Essentially it is the scene in frame E with black area 69, which corresponds to black area 67 in frame D (FIG. 4B). The clear area 68 on frame D has no effect on the remainder of the scene in frame F, but black area 67 prints as black area 69 on frame F.

Next, a negative is made of the positive frame F and that negative is combined with the negative of frame A (FIG. 3A), and the resultant positive is shown in FIG. 6 as frame G. Frame G is a combination of the stock scene in frame E (FIG. 5A) with an area corresponding to the size of black area 69 removed from the scene, and a corresponding image 65 (FIG. 4A) of object 44 replaces the area removed. Thus, when positive frame G (FIG. 6) is produced, it will appear as if object 44 is in the scene that appears on frame E.

Returning to the description of prism 30, as shown in FIG. 2, it comprises a pair of right angle prisms 31 and 32 each with angled faces 33 and 34 at 45° angles to optical axis 24 and to film planes 21 and 22.

A typical half-reflecting prism is made by depositing a thin, dielectric coating on angled face 33 of right angle prism 31. Rather than using a thin, silver coating, thin coatings of dielectric can be used operating under Brewster's Law to reflect at least part of the light in one polarizing plane. ZC&R Company of Long Beach, Calif. manufactures a prism that reflects a portion of the component S-plane across most of the visible spectrum at an angle of about 90°.

Beam splitter prism 30 of the present invention is constructed to reflect the S-plane polarized component and to allow the P-plane component to pass through the prism. It is presently impractical to construct a beam splitter than reflects all of the S-plane energy. The system relies upon all of the P-plane energy and none of the S-plane energy being transmitted.

The placement of the filter to do this is critical. A filter such as filter 35 (in phantom in FIG. 1) may be placed between beam splitter 30 and film A or on the rear face of beam splitter 30. In practice, however, this proves unsatisfactory because stresses in the glass beam splitter 30 alter the orientation of the S-plane polarized light. The present invention places the filter 37 at the hypotenuse of the beam splitter, directly behind reflective coating 33. Any S-plane energy which passes through reflective coating 33 is effectively absorbed. Using dielectric to reflect polarized light also conserves energy because less light must be wasted being absorbed in filters so that lower power lighting is necessary.

S-plane polarized light from screen 45 is reflected to film B at film plane 22 and exposes negative B (FIG. 3B). A neutral density filter 38 (FIG. 1) may be placed between film B and prism 30 for controlling the intensity of light reaching film B. The light from second sources 47 and 48 reflecting off foreground object 44 is of a lower intensity than light from screen 45. The light from sources 47 and 48 also comprises an approximately equal proportions of S-plane and P-plane radiation, and the dielectric coating on face 33 only reflects the S-plane light toward screen B. Therefore, the light reflected from foreground object 44 that reaches film B will be of very low intensity so that area 62 (FIG. 3B) is practically not exposed.

P-plane radiation passes through prism 30 because one of the properties of dielectric 33 and its associated filter 37 is to pass all P-plane light. All of the light from screen 45 is S-plane polarized light. Therefore, none of this light passes to film A at film plane 21. The dielectric coating 33 also transmits the P-plane light from foreground object 44 to film A of film plane 21. The P-plane light is approximately one-half of the original unpolarized light reflected from foreground object 44. Therefore, only image 63 of foreground object 44 is exposed on film A (FIG. 3A). Because of decreases in intensity caused by dielectric coating 33, exposure must account for this change. Therefore, prism 30 divides the light between that light from screen 45 and from sources 47 and 48 and foreground object 44 to film planes 21 and 22 to yield negatives A and B (FIGS. 3A, 3B).

In most applications, film A is color negative stock. Film B is normally black and white film. Using color film for film B at film plane 22 can produce a novel special effect of allowing the portion of the inserted scene behind a tinted, transparent object to be tinted. For example, if foreground object 44 has a colored, transparent region such as a green tinted window on an automobile, in normal viewing one would see the background tinted green through the car window. By using color film at plane 22, part of region 62 of negative B (FIG. 3B) will be colored. This color is carried through in the processing until a portion of the scene shown in frame E (FIG. 5A) is tinted.

There are alternatives for initial polarization. In FIG. 1, source 41 for polarized light creates its polarized light by passing unpolarized light through polarizing screen 42, but screen 42 need not be placed immediately in front of source 41. A large sheet of polarizing material can be placed behind object 44 and in front of screen 45 such as polarizing sheet 49 shown in phantom in FIG. 1. Care must be taken that polarizing sheet 49 not reflect light from source 41 back to camera 10. It may also be possible to incorporate a polarizing filter into retroreflective screen 45 such that all of the light it reflects is polarized.

Various modifications and changes may be made in the configuration described in this specification that may come within the spirit of this invention. The invention embraces all of these changes and modifications coming within the scope of the claims.

We claim:

1. A method for producing a travelling matte image for combining a foreground object with a background scene comprising:
    positioning the foreground object in front of a retroreflective screen;
    illuminating the screen with polarized light;
    illuminating the foreground object with general illumination;
    receiving in a camera light from the screen and from the foreground object;
    dividing the light from the screen and from the object in the camera by directing the light polarized in the manner it is polarized from the screen to a first imaging medium to create a first image of the foregoing object and the screen on the first imaging medium, and directing the light that is not polarized in the manner it is polarized from the screen to a second imaging medium to create a second image of the foreground object and the screen on the second imaging medium.

2. The method of claim 1 wherein the steps of directing light to the first and second imaging mediums comprises reflecting the light polarized in the manner it is polarized from the screen to the first imaging medium and passing the light that is not polarized in the manner it is polarized from the screen to the second imaging medium.

3. The method of claim 1 further comprising the step of illuminating the screen and the foreground object with at least two sources of light, the first source being positioned on the optical axis of the camera and emitting polarized light and the second source being positioned off the optical axis, reflecting light from the source of polarized light to a half-silvered reflector mounted on the optical axis angled to direct light along the optical axis, the light returning from the foreground object and the screen passing through the half-silvered mirror.

4. A method for producing a photographic image of a scene comprising:
    directing light polarized in one orientation, along the optical axis of a camera toward an object and toward a retro-reflective screen behind the object, the retro-reflective screen reflecting light back toward the source of light, the object blocking some polarized light from behind the object;
    illuminating the object with light that includes light not polarized in the one orientation and directing light reflected from the object to the camera;
    directing the light polarized in the one orientation, that reaches the camera to a first imaging medium and directing the light not polarized in the one orientation reflected from the object to a second imaging medium.

5. The method of claim 4 wherein the step of illuminating the object with light not polarized in the one orientation comprises directing light off of the optical axis toward the object.

6. The method of claim 4 wherein the step of directing the light polarized in the one orientation to the first imaging medium compromises reflecting such light to the first imaging medium and the steps of directing light not polarized to the second imaging medium comprises allowing such light to pass to the second imaging medium.

7. The method of claim 4 further comprising combining the image received by the first imaging medium with a background scene and adding the image received by the second imaging medium in the combined image of the first imaging medium and the background scene.

8. An apparauts inserting an image of a foreground object into a scene comprising:
    a camera mounted in front of the foreground object, the camera having first and second imaging mediums;

a retro-reflective screen mounted behind the foreground object;

polarized illumination means comprising a source of light polarized in the one orientation for directing light polarized in one orientation along the optical axis of the camera toward the the screen and reflected by the screen to the camera from behind the foreground object, the foreground object shadowing some polarized light reflecting to the camera;

general illunimation means for illuminating the foreground object; the light reflecting from the foreground object to the camera; and dividing means in the camera for directing light polarized in the one orientation to the first imaging medium and for blocking light polarized in the one orientation from the second imaging medium.

9. The apparatus of claim 8 wherein the dividing means comprises a angled reflected face having reflective means for reflecting light polarized in the one orientation to the first imaging means and for passing light not polarized in the one orientation to the second imaging means.

10. The apparatus of claim 9 wherein the reflecting face is part of a prism, the reflecting means comprising dielectric material on the reflecting face for reflecting light polarized in one plane toward the first imaging means.

11. The apparatus of claim 10 wherein the prism has a generally square cross-section, the reflective face being a diagonal extending between opposite corners of the prism.

12. The apparatus of claim 8 wherein the dividing means comprises a half-silvered reflecting member for reflecting some light to the first imaging medium and passing light to the second imaging medium, and a polarizing filter between the dividing means and the second imaging medium for filtering light polarized in the one orientation from reaching the second imaging medium.

* * * * *